Aug. 19, 1924.

A. MAC KINNON 1,505,908

METHOD AND APPARATUS FOR APPLYING PLASTIC COMPOSITIONS

Filed July 25, 1923    2 Sheets-Sheet 1

INVENTOR.
ARCHIBALD MACKINNON.
BY Richard W. Brunk
ATTORNEY.

Aug. 19, 1924.
A. MAC KINNON
1,505,908
METHOD AND APPARATUS FOR APPLYING PLASTIC COMPOSITIONS
Filed July 25, 1923  2 Sheets-Sheet 2
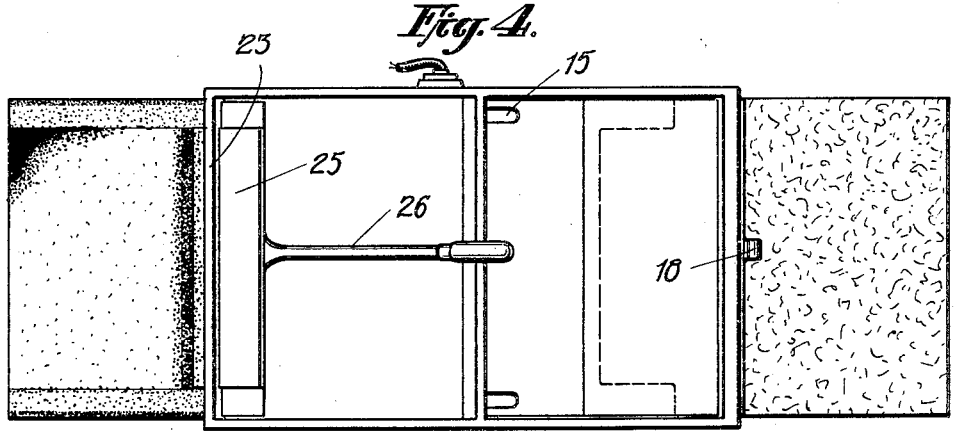
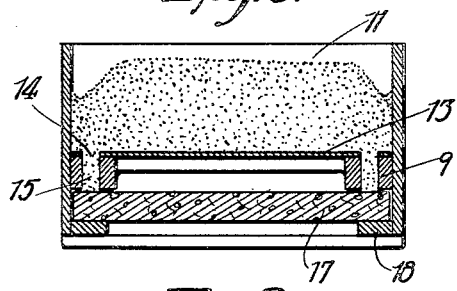
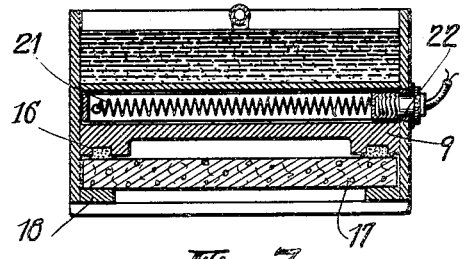
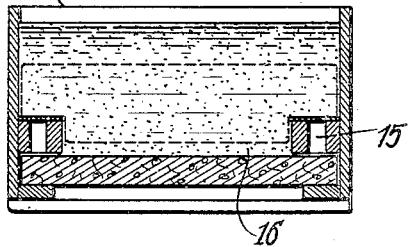
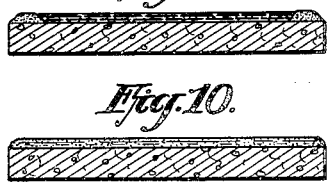
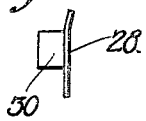
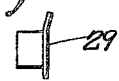
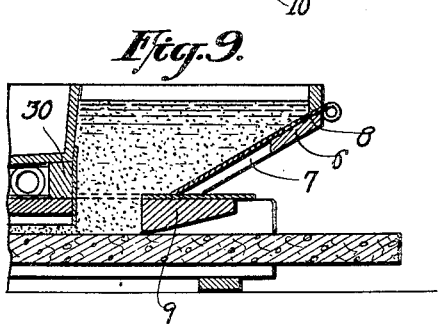
INVENTOR.
ARCHIBALD MACKINNON.
BY
ATTORNEY.

Patented Aug. 19, 1924.

1,505,908

UNITED STATES PATENT OFFICE.

ARCHIBALD MacKINNON, OF TUCKAHOE, NEW YORK.

METHOD AND APPARATUS FOR APPLYING PLASTIC COMPOSITIONS.

Application filed July 25, 1923. Serial No. 653,730.

*To all whom it may concern:*

Be it known that I, ARCHIBALD MACKINNON, a citizen of the United States, residing at Tuckahoe, in the county of Westchester and State of New York, have invented certain new and useful Improvements in Methods and Apparatus for Applying Plastic Compositions, of which the following is a specification.

This invention relates to the method and apparatus for applying a plastic composition such as tar, cement, or their equivalent to a flat surface such as insulating, cork wall board, beaver board, tiling, shingles or other interior and exterior building construction.

The primary object of my invention is to provide a novel and improved method and apparatus for applying a coating of a plastic composition such as tar or cement, for instance, to the surface of a wall board and without the aid of tools, and in which an even layer or thickness of the plastic composition may be spread over the surface of the board so that it may be directly applied to the wall thus facilitating the work of the workman.

In applying a plastic composition such as tar to cork or wall boards, it has been the practice to spread the plastic composition across the face of the board by a brush or the board has been dipped into the composition, permitted to drain and then the board is fitted to the wall. This practice does not permit of clean or regular work and the thickness of the plastic composition cannot be conveniently varied and the slow work retards building construction materially. My invention overcomes the above difficulty by providing a novel and improved construction wherein tar or cement may be applied to the surface in a smooth even layer of various thicknesses, if so desired, and without the aid of tools or particularly skilled workman.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a perspective view showing the apparatus and the manner of feeding the boards beneath the hoppers containing the plastic composition.

Figure 4 is a plan of the apparatus.

Figure 5 is a sectional view through the sand hopper.

Figure 6 is a sectional view through the tar hopper showing the heating arrangement.

Figure 7 is a sectional view of an insulated board, such as a piece of cork, after the plastic composition has been applied.

Figure 8 is a similar view to that shown by Figure 5 indicating the manner of applying cement to the board.

Figure 9 is a sectional view similar to that shown by Figure 3 when the apparatus is used for applying cement.

Figure 10 is a sectional view through the insulated board showing the cement on its surface.

Figures 11 and 12 are views of wipers or scraping elements for regulating the thickness of the cement applied to the board.

Figure 1:
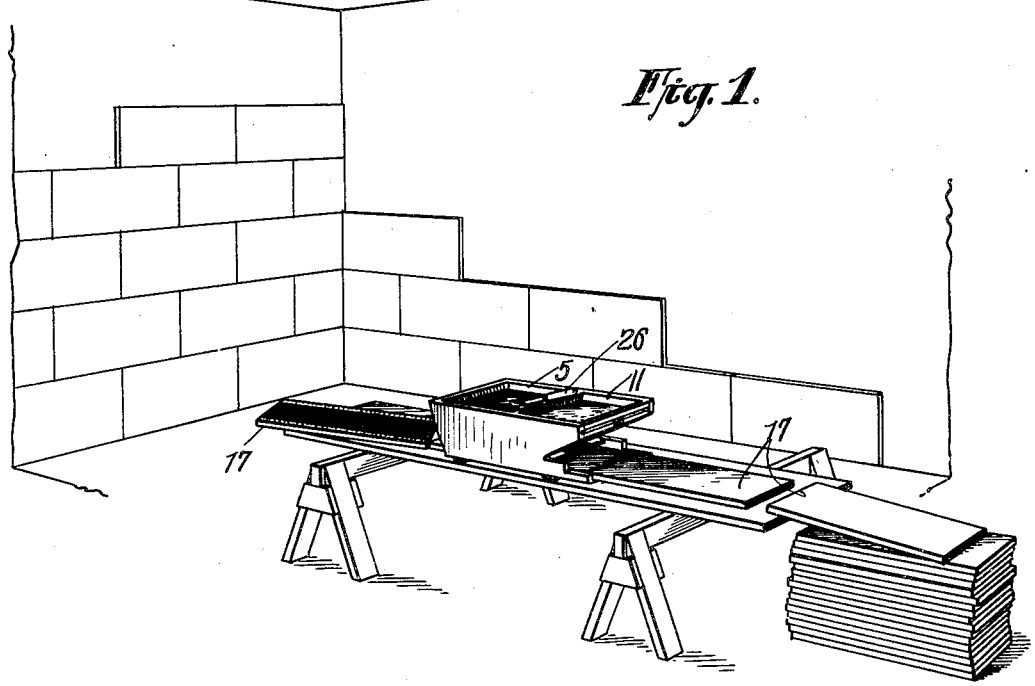

Referring now to the drawings wherein like reference characters designate corresponding parts throughout the several views, my apparatus comprises a receptacle or container having a tar hopper 5 to receive any suitable plastic composition which is to be applied to a wall board such as cork, beaver board or other building construction. As shown by Figures 1 to 6 inclusive, the rear inclined wall 6 is provided with enlarged openings 7 which is normally closed by a covered plate 8. A false bottom 9 based from the inclined bottom 10 of the tar hopper extends throughout the length of the container and beyond the sand hopper 11 adjacent the hopper 5. The enlarged opening 12 in the false bottom is adapted to receive a cut-off plate 13 extending across the same, the cut-off plate is provided with recesses 14 which are adapted to align with slots or openings 15 adjacent the side wall of the container so that the sand may freely flow through the bottom and at the sides only to the top surface of the board to be coated.

In applying a coating of tar or other fluid plastic composition, in order to prevent the flow of the said composition beyond the sides of the board, I have provided the means above described whereby a narrow layer of sand is fed to the side and on the top surface of the board to be coated preliminary to receiving the plastic composition from the tar hopper.

The bottom surface of the false bottom is thus provided with grooves 16 so that when the board 17 is passed beneath the false bottom on the guide rails 18, a layer of sand will be deposited along the sides of the board and in an even manner.

When different thicknesses of board are to be coated and in order to prevent the sand from creeping inwardly on the board which must be substantially flush with the bottom face of the false bottom 9, strips are positioned on the guide rails 18 so as to compensate for the reduced thickness of the board as the case may be. In other words, the board 17 must ride between the rails 18 and the bottom surface of the false bottom 9 freely in order to receive the deposit of sand for the purpose above specified.

Between the inclined tar hopper and the top face of the false bottom, I have provided a removable heater 20 having coils 21 therein so that a plug 22 may be inserted and the current utilized to maintain the tar in the hopper in a plastic state. The front wall 23 of the tar hopper is provided with an opening or outlet 24, which opening is controlled by a wedge-shaped head 25 extending across the same to which the rod and handle 26 are connected so that the quantity of tar that is permitted to flow may be regulated, depending upon its density. The opening 24 does not extend entirely across the front wall and consequently, permits the tar to freely flow on the surface of the board to the layer of sand which prevents the tar from flowing over the sides of the board.

Now, when it is desired to apply a coating of cement, for instance, the heater 20 may be removed and by reversing the cut-off plate 13, the opening 15 may be closed and the material may then flow through the enlarged opening in the false bottom. The depth of the material to be deposited is regulated by the scraping plate 28 or plate 29 of a block 30, which plate of course extends somewhat below the enlarged opening of said false bottom, as clearly shown by Figure 9 of the drawings.

Figure 2:
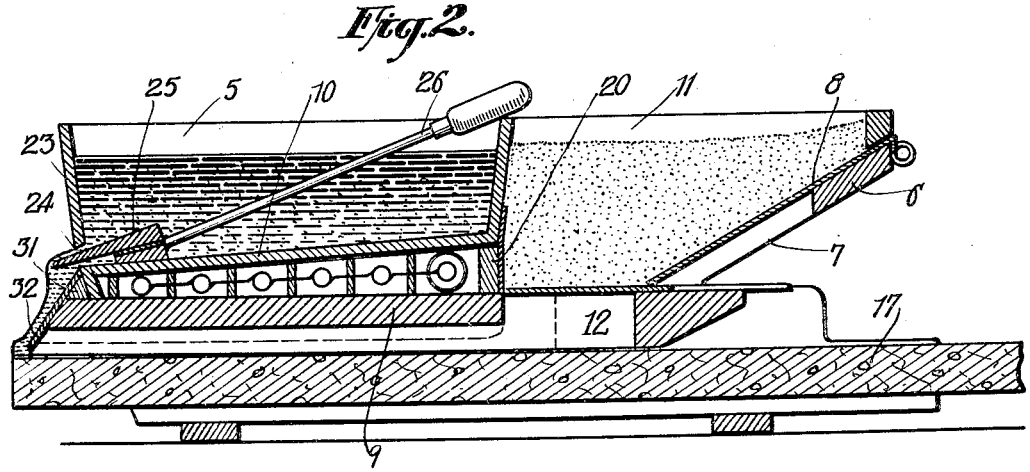
Figure 2 is a longitudinal sectional view through the apparatus showing the cut-off plate closed.
Figure 3:
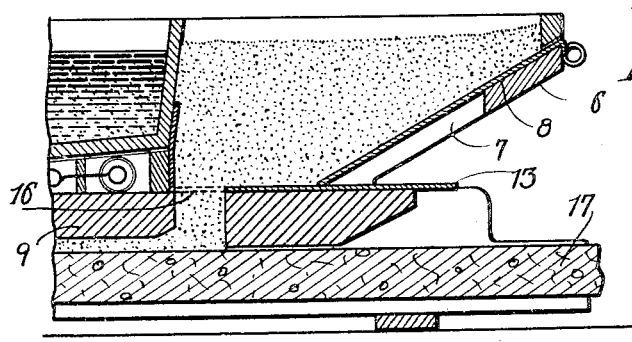
Figure 3 is a fragmentary sectional view showing the cut-off plate open.

Referring to Figure 2 of the drawings, however, it will be observed that the false bottom 9 extends somewhat beyond the front wall and in order to permit the plastic composition to freely flow down over the surface of the board, I have provided a substantially triangular block 31 having a plate 32 thereon extending across the opening 24, which plate is substantially adjacent the top surface of the board as the same is slid through on the guide rails 18, above referred to.

From the above construction, it will be readily seen that I have provided a novel and improved apparatus and method for applying a plastic coating which can be applied by an unskilled workman without the aid of tools or other devices, which is extremely positive in operation, practical and highly efficient. It will be readily recognized by those skilled in the art that it is immaterial whether tar, sand, cement or any other plastic composition for coating a flat surface is utilized. The thickness or depth of the layer to be applied can be regulated and controlled without particular skill of the mechanic.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. The method of applying a plastic composition to the surface of a piece of material which consists in depositing layers of a pulverulent substance along the sides of a surface to be covered and then feeding the plastic composition between the said layers as the piece of material is moved from one position to another.

2. The method of applying a plastic composition to the surface of a piece of material which consists in depositing continuous uniform layers of a pulverulent substance along the sides of the surface to be covered and simultaneously feeding the plastic composition between the said layers as the piece of material is moved from one position to another.

3. The method of applying a plastic composition to the surface of a piece of material which consists in depositing continuous uniform streams of a pulverulent substance along the sides of the surface to be covered and simultaneously feeding and varying the thickness of the plastic composition as the piece of material is moved from one position to another.

4. An apparatus of the class described comprising a hopper having an outlet at its front end, a second hopper adjacent the first mentioned hopper, a false bottom extending beneath both of the hoppers, means for depositing a pulverulent substance through the false bottom and at the sides thereof and means for sliding a piece of material below the false bottom to receive the discharge of the pulverulent material in advance of material from the first hopper.

5. An apparatus of the class described comprising a hopper having an outlet at its front end, means for controlling the discharge of material from said hopper, a second hopper adjacent the first mentioned hopper, a false bottom extending beneath both of the hoppers, said bottom having openings in the sides thereof for the passage of a pulverulent substance from the second hopper, and spaced guiding means below the false bottom to permit the sliding of a piece of material to receive the discharge of the pulverulent substance in advance of the discharge through the outlet.

6. An apparatus of the class described comprising a hopper having a false bottom, a groove formed on the lower face of the bottom and spaced means below the false bottom and at the sides thereof for guiding a piece of material to be coated when passed beneath the said bottom.

7. An apparatus of the class described comprising a hopper having a false bottom, said bottom having an enlarged opening and apertures adjacent the sides thereof, a cut-off plate for said apertures, a groove formed in the false bottom of the width of the enlarged opening, spaced guiding means below the false bottom to support a piece of material to be coated when passed beneath the hopper and false bottom, and means within the opening to vary the depth of the discharged substance.

8. An apparatus of the class described comprising a hopper having an outlet at its front end, a second hopper adjacent the first mentioned hopper, a false bottom extending beneath both of the hoppers, a heater supported by the false bottom and beneath the first mentioned hopper, said false bottom having side openings for the deposit of a pulverulent material from the second hopper, longitudinally extending grooves on the lower face of the false bottom and spaced rails below the false bottom to support and guide a piece of material to be coated when passed beneath the second hopper.

9. An apparatus of the class described comprising a dual compartment container, means for sliding a piece of material beneath the compartments, means for depositing a pulverulent substance from one of the compartments along the sides of the material as it is being moved and means for depositing a plastic composition from the front of the second compartment to the surface of the material as it is being withdrawn.

In testimony whereof I affix my signature in presence of two witnesses.

ARCHIBALD MacKINNON. [L. S.]

Witnesses:
WILLIAM MACKINNON,
ALEXANDER MACKINNON.